United States Patent [19]

Miyakoshi et al.

[11] 4,433,851
[45] Feb. 28, 1984

[54] FRONT SUSPENSION SYSTEM FOR MOTORCYCLES

[75] Inventors: Shinichi Miyakoshi, Saitama; Tokio Isono, Tokyo, both of Japan

[73] Assignee: Honda Giken Kogyo Kabushiki Kaisha, Tokyo, Japan

[21] Appl. No.: 408,286

[22] Filed: Aug. 16, 1982

[30] Foreign Application Priority Data

Aug. 17, 1981 [JP] Japan .................. 56-122104[U]

[51] Int. Cl.³ .............................................. B62K 25/12
[52] U.S. Cl. .................................. 280/277; 188/303; 267/57; 280/286
[58] Field of Search ............... 280/276, 277, 284, 285, 280/286, 288; 188/303; 267/57, 57.1 A

[56] References Cited

U.S. PATENT DOCUMENTS 2,401,869  6/1946  Halliday ........................... 280/286
3,090,638  5/1963  Somhegyi ...................... 280/277 X
4,186,936  2/1980  Offenstadt et al. .............. 280/277

FOREIGN PATENT DOCUMENTS 511991   6/1952  Belgium ........................... 280/277
806322   6/1951  Fed. Rep. of Germany ...... 280/276
1038312  5/1953  France ............................ 280/277
468444   1/1952  Italy ................................ 280/276
562686   7/1944  United Kingdom ............. 267/57

Primary Examiner—Joseph F. Peters, Jr.
Assistant Examiner—Mitchell J. Hill
Attorney, Agent, or Firm—Irving M. Weiner; Pamela S. Burt; John L. Shortley

[57] ABSTRACT

A front suspension system for a motorcycle, including an upper fork member supported by a vehicle body frame, a lower fork member which supports a front wheel and a link mechanism connecting between the upper and lower fork members. The system includes a pivotal damper which provides a pivotal reaction force proportional to a pivoted amount thereof in operative cooperation with the link mechanism. The pivotal damper is disposed in the interior of the upper fork member to thereby attain simplification of the construction, reduction of the number of parts and improvement of the aesthetic appeal.

6 Claims, 7 Drawing Figures

FRONT SUSPENSION SYSTEM FOR MOTORCYCLES

BACKGROUND OF THE INVENTION

1. Field of the Invention

The present invention relates generally to a front suspension system for motorcycles. More particularly, the invention relates to a front suspension system comprising a link mechanism which supports a front wheel and a pivotable-shaft actuated damper operatively cooperating with the link mechanism.

2. Description of Relevant Art

A known front suspension system for a motorcycle is constructed such that an upper fork is pivotably secured for right and left steering motion to a head pipe at the front end of a body frame, and a lower fork is pivotably suspended from the upper fork through a link member, with a front wheel being supported by one end of the lower fork to permit vertical movements of the front wheel corresponding to undulations of the road surface through the pivotal movement of the lower fork.

Such a known type of front suspension system for a motorcycle, wherein a pivotal damper having a pivot shaft adapted to provide a damping force proportional to a pivoted amount thereof is operatively connected between the lower fork and the upper fork to cushion vertical movements of the front wheel, is disclosed, for example, in Japanese Patent Application No. 81699/1981.

In the aforesaid known type of front suspension system, however, because the damper is connected to the upper fork and particularly between the right and left side members of the upper fork, the entire construction including a damping force transmitting path, etc. is relatively complex, thus leaving room for improvement from the standpoint of reducing the number of components and the manufacturing cost, as well as enhancing the rigidity of components and the overall aesthetic appeal.

The present invention effectively overcomes the above-mentioned shortcomings attendant a conventional front suspension system for motorcycles.

SUMMARY OF THE INVENTION

The present invention provides a front suspension system for motorcycles, comprising an upper fork member supported for pivotal steering motion by a vehicle body frame, a lower fork member which supports a front wheel at one end thereof, a link mechanism for pivotably suspending the lower fork member from the upper fork member, and at least one pivotable-shaft actuated damper having a pivot shaft adapted to provide a pivotal reaction force proportional to a pivoted amount thereof in operative cooperation with the link mechanism, the pivotable-shaft actuated damper being disposed in the interior of the upper fork member.

It is an object of the present invention to provide a front suspension system for motorcycles having a relatively simple construction and thus a relatively small number of components, while effectively ensuring a required degree of rigidity. The suspension system comprises a steerable upper fork, a lower fork which supports a front wheel, a link mechanism for pivotably suspending the lower fork from the upper fork, and at least one pivotable-shaft actuated damper having a pivot shaft adapted to provide a pivotal reaction force proportional to a pivoted amount thereof in operative cooperation with the link mechanism.

It is another object of the present invention to provide a front suspension system for motorcycles having improved aesthetic appeal and commercial value.

The above and further objects, details and advantages of the present invention will become apparent from the following detailed description of preferred embodiments of the invention when read in conjunction with the accompanying drawings.

DETAILED DESCRIPTION OF PREFERRED EMBODIMENTS

Figure 1:
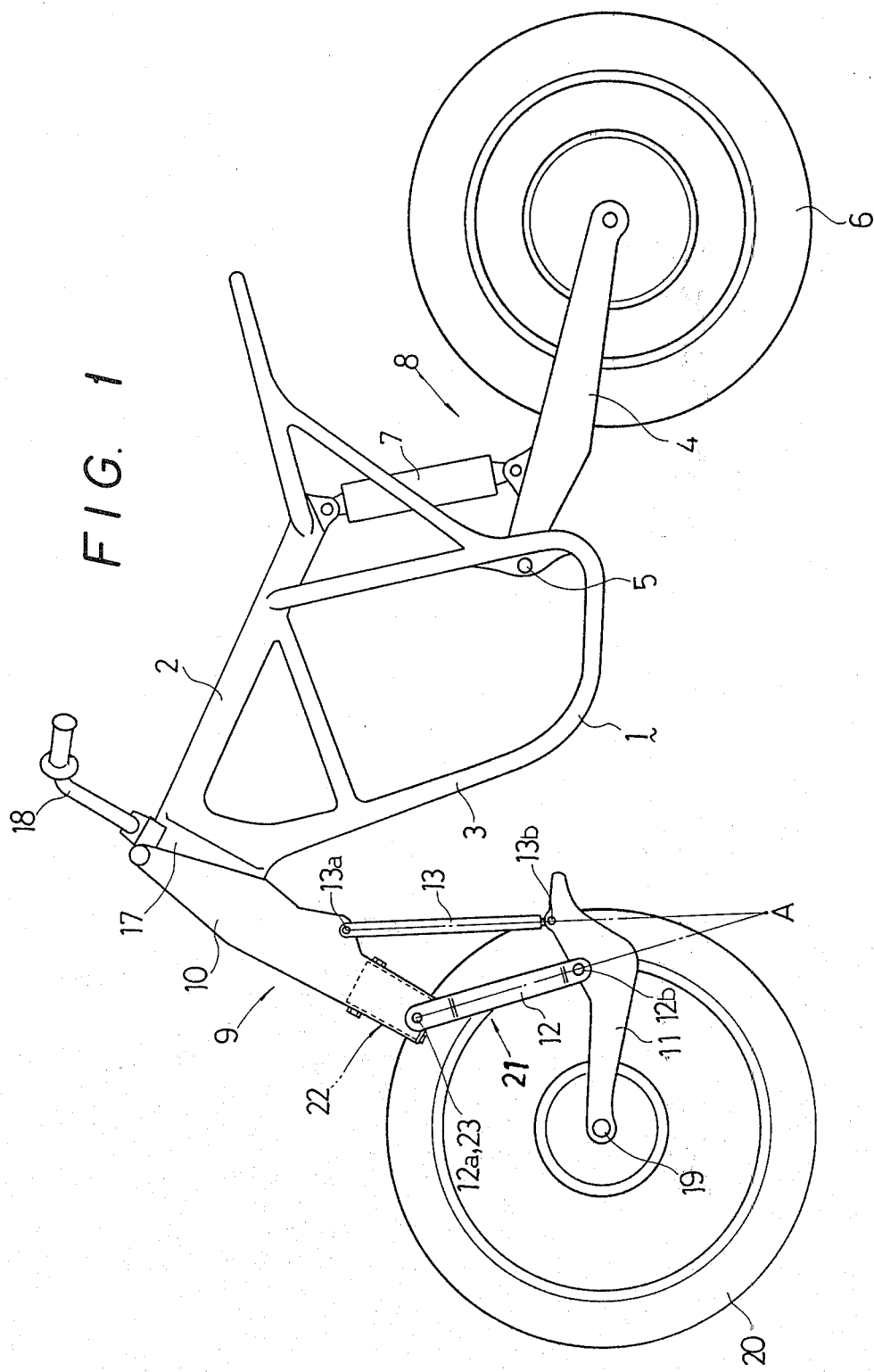
FIG. 1 is an overall side view of a motorcycle provided with a front suspension system in accordance with a first embodiment of the present invention, and showing a basic structure thereof.

FIG. 1 is an overall side view showing a basic structure of a motorcycle to which is applied a front suspension system in accordance with a first embodiment of the present invention. The front end of a rear fork 4 is vertically pivotably secured through a pivot shaft 5 to a vehicle body frame 1 which comprises a main frame 2 and a down tube 3, and a shock absorber 7 for a rear wheel is disposed between the rear fork 4 which supports the rear wheel at the rear end thereof and an upper rear portion of the vehicle body frame 1. The rear fork 4 and the shock absorber 7 constitute a rear suspension system 8.

On the other hand, a front suspension system 9 comprises an upper fork 10, a lower fork 11, and two pairs of front and rear arms 12 and 13 which are pivoted at the upper and lower ends thereof to both forks 10 and 11 through shafts 12a, 12b, 13a and 13b so as to thus interconnect the forks 10 and 11.

Figure 2:
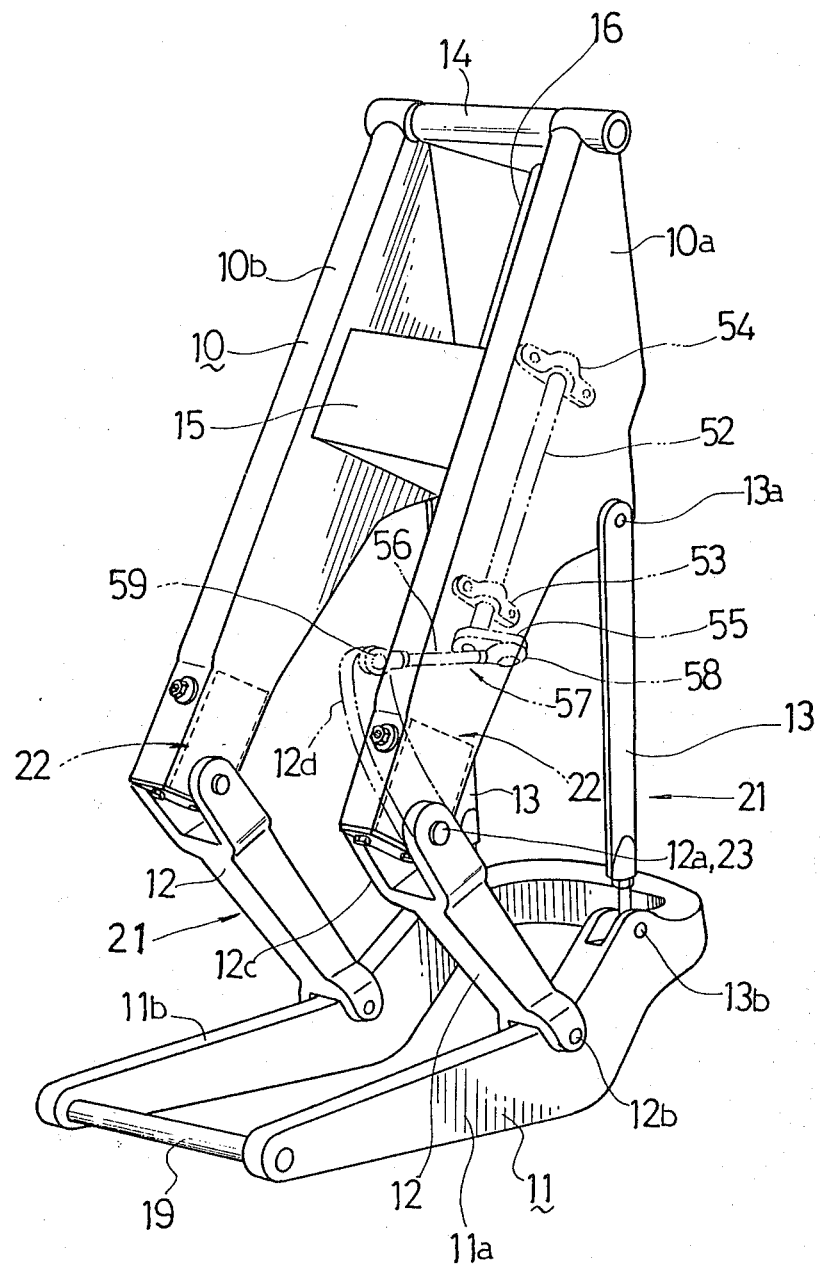
FIG. 2 is an enlarged perspective view of the front suspension system shown in FIG. 1.

As shown in FIG. 2, a top bridge 14 and a bottom bridge 15 interconnect right and left side members 10a and 10b of the upper fork 10, and a stem shaft 16 is fixed substantially vertically through rear portions of the top and bottom bridges 14, 15. The stem shaft 16 is pivotably inserted into a head pipe 17 fixed to the front end of the vehicle body frame 1 as shown in FIG. 1, whereby the upper fork 10 is secured to the head pipe 17 so as to be pivotable to the right and left and is connected to the vehicle body frame 1 so that it may be steered by a handlebar 18. Between forked front ends of the lower fork 11 is transversely mounted a front wheel axle 19, and thus a front wheel 20 is supported by the lower fork 11. Vertical movements of the front wheel 20 in following undulations of the road surface are attained by a pivotal movement of the arms 12 and 13 about the respective shafts 12a and 13a and by a consequent vertical movement of the lower fork 11 along with pivoting of the lower fork about an intersecting point A of extension axes of the arms 12 and 13 as a momentary pivot center. The front suspension system 9 is thus defined by right and left quadrilateral link mechanisms 21 each of which comprises the upper fork 10 as a relatively stationary link member and the lower fork 11, and arms 12, 13 as movable members. As shown in FIG. 2, a set of front and rear arms 12 and 13 of each link mechanism 21 is provided for each set of right and left side members 10a, 11a and 10b, 11b of the upper and lower forks 10, 11.

Figure 3:
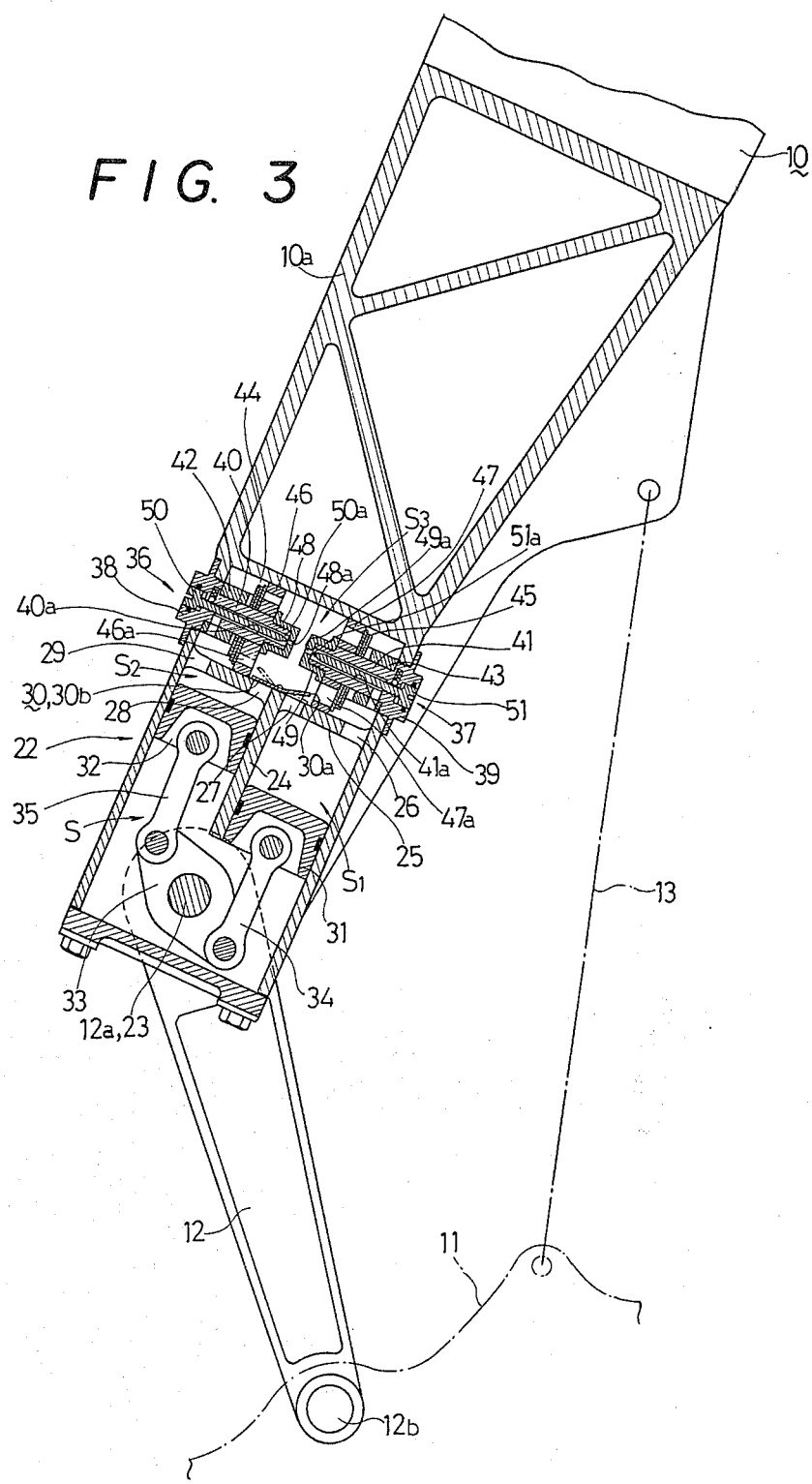
FIG. 3 is an enlarged sectional side view of a pivotal damper portion of the front suspension system of FIG. 2.

In the interior of the upper fork 10 is formed a hollow chamber S as shown in FIG. 3, and in the hollow chamber S is incorporated a pivotable-shaft actuated damper mechanism 22 comprising a so-called lever damper for cushioning the front wheel. Such positioning of the pivotable-shaft actuated damper mechanism 22 within the upper fork 10 is advantageous in that when molding the body of the upper fork 10 which is a relatively highly rigid member, the case portion of the damper mechanism 22 can be simultaneously integrally formed. Because the body of the upper fork 10 also serves as a casting for the damper mechanism 22, it is possible to attain simplification of structure and reduction of the number of parts. Further, the heat of hydraulic fluid which is compressed to a high pressure when the damper mechanism 22 generates a damping force, is dissipated efficiently by utilizing the entire surface of the body of the upper fork 10 as a heat dissipation surface, thus providing effective air cooling.

Figure 4:
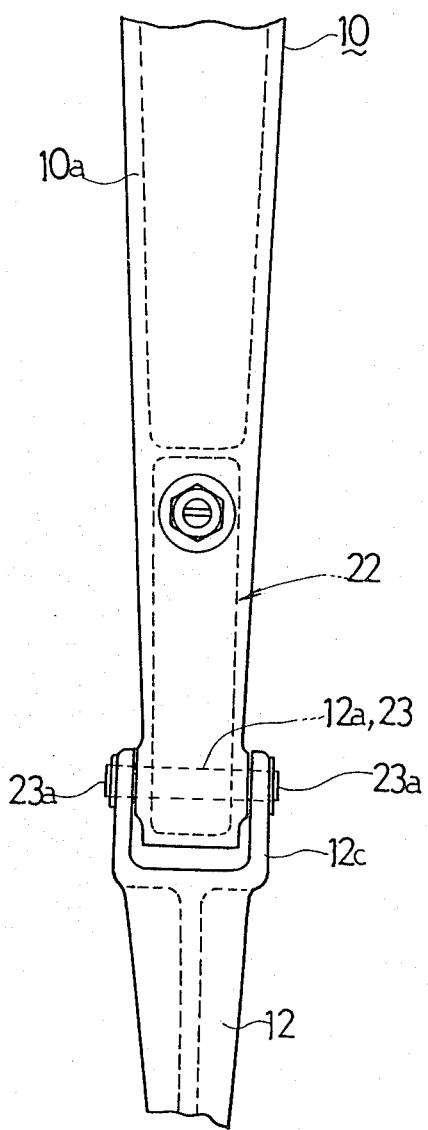
FIG. 4 is a reduced front view of the pivotal damper portion of FIG. 3.

In this embodiment, the pivotable-shaft actuated damper mechanism 22 is incorporated in the lower end portion of a side member of the upper fork 10, and both ends 23a of a pivot shaft 23 of the damper mechanism 22 project in the transverse direction of the vehicle body from both sides of the side member as shown in FIG. 4. A bifurcated upper end portion 12c of each of the front arms 12 of the front and rear arms 12 and 13 is fixed to and engaged with the projecting ends 23a. Thus, the shaft 12a which connects between the upper fork 10 and the arm 12 corresponds to the pivot shaft 23, and the pivot shaft 23 which is a constituent member of the damper mechanism 22 also serves as a connecting shaft between the upper fork 10 and the arm 12. When the arm 12 pivots, the pivot shaft 23 also pivots integrally therewith and the damper mechanism 22 generates a damping force, and thus the arm 12 is employed as a pivoting lever. In this manner, the arm 12, originally employed for connecting between the upper fork 10 and the lower fork 11, also serves as a pivoting lever, and this arrangement is preferably attained by incorporating the damper mechanism 22 in the lower portion of a side member of the upper fork 10, whereby, moreover, the position of the damper mechanism 22 approaches the lower fork 11 disposed below the upper fork 10. Thus, the operating force transmission path connecting between the damper mechanism 22 and the lower fork 11 can be constituted by only the arm 12, i.e., the number of constituent members of the path is reduced, the path is shortened, and a desirable mechanical rigidity of the path is attained.

The foregoing advantages are also attained when the damper mechanism 22 is incorporated in the portion at which the upper end portion of the rear arm 13 is connected to the upper fork 10 through the shaft 13a and the arm 13 is employed as a pivoting lever for the damper mechanism 22. In the embodiment illustrated in FIG. 2, the damper mechanism 22 is mounted in the interior of both right and left side members 10a and 10b of the upper fork 10, however, it may alternatively be incorporated in only one of the side members.

Any suitable type of pivotable-shaft actuated damper mechanism, such as a vane type or piston type, may be adopted for the pivotal damper mechanism 22, provided that it produces a pivotal reaction force or damping force according to a pivoted amount of the pivot shaft 23. The structure of the damper mechanism 22 employed in the present embodiment will be described hereinbelow with reference to FIG. 3.

The hollow chamber S to be filled with hydraulic fluid formed in the upper fork 22 is partitioned by a longitudinal wall 24 and a transverse wall 25 into rear and front piston chambers $S_1$, $S_2$ and an upper damping force generating chamber $S_3$, the chambers $S_1$ and $S_2$ communicating with the chamber $S_3$ via through holes 26, 27, 28 and 29. The through holes 27 and 28 are opened and closed alternately by valve pieces 30a and 30b. Within the chambers $S_1$ and $S_2$ are slidably accommodated pistons 31 and 32, respectively. The pistons 31, 32 and the pivot shaft 23 which extend across the hollow chamber S are interconnected through a piston arm 33 and connecting rods 34, 35. Within the chamber $S_3$ is mounted damping force generating mechanisms 36 and 37 which are symmetrical in the front and rear. The mechanisms 36 and 37 respectively comprise tubular portions 40, 41 integral with covers 38, 39 applied to front and rear surfaces of the upper fork 10; disc-like members 46, 47 having spacers 42, 43, a plurality of plate valves 44, 45 made of a leaf spring material and orifices 46a, 47a; caps 48, 49 having orifices 48a, 49a and threadedly engaged with the tip ends of the tubular portions 40, 41 to thereby hold and fix the disc-like members 46, 47, including the spacers 42, 43 and the plate valves 44, 45; and needles 50, 51 loosely inserted in interior passages 40a, 41a of the tubular portions 40, 41 and having tapered tip ends 50a, 51a which face the orifices 48a, 49a. The needles 50 and 51 are of a screw type capable of moving forward and backwards by being threadedly engaged with the covers 38 and 39 so as to be operable from the exterior.

The operation of the above-described front suspension system is as follows.

As the front wheel 20 moves upwardly in following undulations of the road surface, the arms 12 and 13 in FIG. 1 pivot in a counterclockwise direction about the shafts 12a and 13a, thus causing the shaft 23 to pivot in the same direction, so that the piston 31 shown in FIG. 3 slides upwardly to compress the hydraulic fluid in the chamber $S_1$. As a result, the hydraulic fluid in the chamber $S_1$ flows through the through hole 29 in an opened state of the valve piece 30a, the orifice 48a, interior passage 40a and through hole 29 into the chamber $S_2$. At this time, because the opening area of the orifice 48a is narrowed to an appropriate extent by the insertion therein of the tapered portion 50a of the needle 50, the orifice 48a throttles the flow of the hydraulic fluid to thereby generate a damping force, and such damping force acts as a cushioning force against the upward movement of the front wheel 20. The opening area of the orifice 48a can be adjusted by moving the screw needle 50 threadedly forward or backward, and the magnitude of the damping force can thus be set according to the conditions of the road surface, etc. If the speed of upward movement of the front wheel 20 is relatively high, the hydraulic fluid in the chamber $S_1$ is compressed to a relatively high pressure by the piston 31, so that the plate valve 44 on which is exerted the oil pressure through the orifice 46a deflects, whereby the orifice 46a is opened, thus allowing the hydraulic fluid to flow through the two orifices 48a and 46a. As a result, a damping force of a magnitude proportional to the speed of upward movement of the front wheel 20 is generated.

When the front wheel 20 moves downwardly, the arms 12 and 13 pivot in a clockwise direction about the shafts 12a and 13a in FIG. 1, thus causing the piston 32 shown in FIG. 3 to slide upwardly, so that the hydraulic fluid in the chamber $S_2$ flows through the through hole 28 in an opened condition of the valve piece 30b, the orifice 49a, interior passage 41a and through hole 26 into the chamber $S_1$. Also at this time, because the opening area of the orifice 49a is narrowed to an appropriate extent by the insertion therein of the tapered portion 51a of the needle 51, the flow throttling action of the orifice 49a causes a damping force to be generated. The magnitude of such damping force can be adjusted by moving the screw needle 51 threadedly forward and backward. If the speed of downward movement of the front wheel 20 is relatively high, the hydraulic fluid in the chamber $S_2$ is pressurized to a relatively high level by the compressing action of the piston 32, so that the plate valve 45 on which is exerted the oil pressure deflects, whereby the orifice 47a is opened, thus allowing the hydraulic fluid to flow through the two orifices 49a and 47a to generate a damping force proportional to the downwardly moving speed of the front wheel 20.

The front suspension system may be constructed so that the vertical movement of the front wheel 20 is cushioned in an auxiliary manner by the spring force of a torsion bar in addition to the damping force of the pivotal damper mechanism 22. An example of such a construction including a torsion bar is shown in dashed line in FIG. 2.

More specifically, a torsion bar 52 is pivotably supported at the lower end portion thereof by a supporting bracket 53 on the outside surface of the side member 10a of the upper fork 10, and is fixed at the upper end portion thereof by a fixing bracket 54. From the bifurcated upper end portion 12c of the front arm 12 there extends integrally upwardly a tip portion 12d beyond the shaft 12a. The lower end of the torsion bar 52 and the tip portion 12d are connected by a link mechanism 57 comprising a link arm 55 and a rod 56 and having a predetermined length in the transverse direction of the vehicle body. The connection between the link arm 55 and the rod 56 and that between the rod 56 and the tip portion 12d are effected through ball joints 58 and 59. As the arm 12 pivots about the shaft 12a to permit the vertical movement of the front wheel 20, the torsion bar 52, having the lower end thereof supported so as to be twistable by the link mechanism 57, is twisted and the spring force of the torsion bar 52 acts additionally as a cushioning force against the vertical movement of the front wheel 20.

Figure 5:
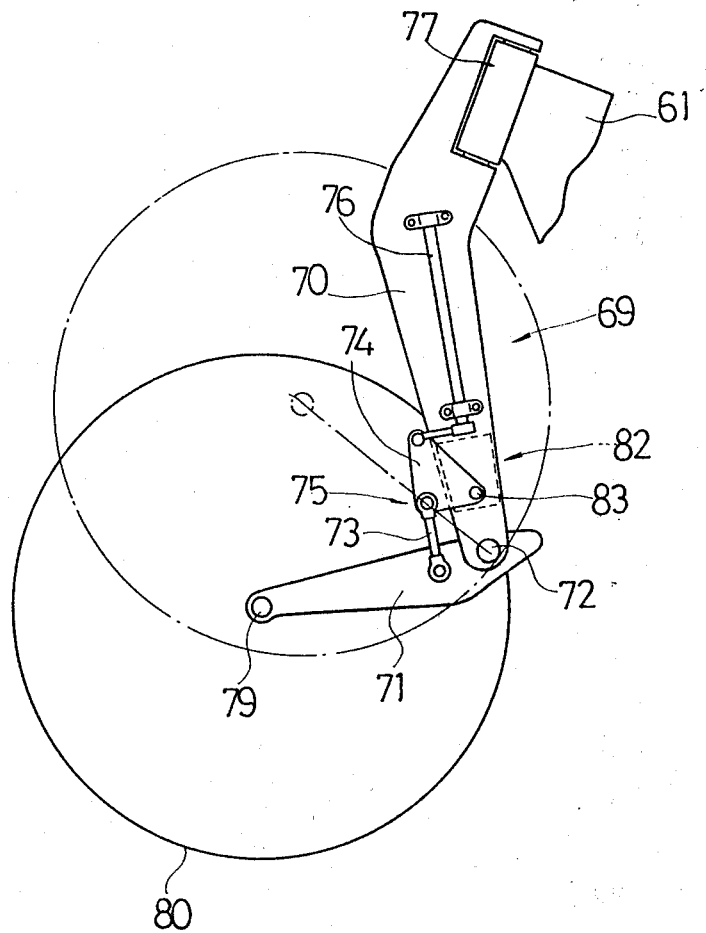
FIG. 5 is a side view of a front suspension system in accordance with a second embodiment of the present invention.

Referring now to FIG. 5, there is shown a front suspension system 69 according to a second embodiment of the present invention. The front suspension system 69 is constructed of an upper fork 70 secured for right and left pivotal motion to a head pipe 77 at the front end of a vehicle body frame 61, and an oscillating fork 71 vertically pivotably secured at the rear end thereof to the upper fork 70 through a shaft 72 and supporting a front wheel 80 at the front end thereof. Because the upper fork 70 and the oscillating fork 71 are interconnected by the shaft 72 in a position rearward of a front wheel axle 79, the front suspension system 69 acts as a leading link mechanism, in which the oscillating fork 71 serves as a rocking member for supporting the front wheel. In the interior of the upper fork 70 is disposed a pivotable-shaft actuated damper mechanism 82 having a pivot shaft 82. The pivot shaft 83 is connected to the oscillating fork 71 through an operating force transmission means 75 comprising a rod 73 and a substantially triangular lever 74. Because the position of the damper mechamism 82 disposed within the upper fork 70 at a lower portion of the upper fork 70 near the oscillating fork 71, the operating force transmission means 75 is shortened and the mechanical rigidity thereof is substantially improved.

Figure 6:
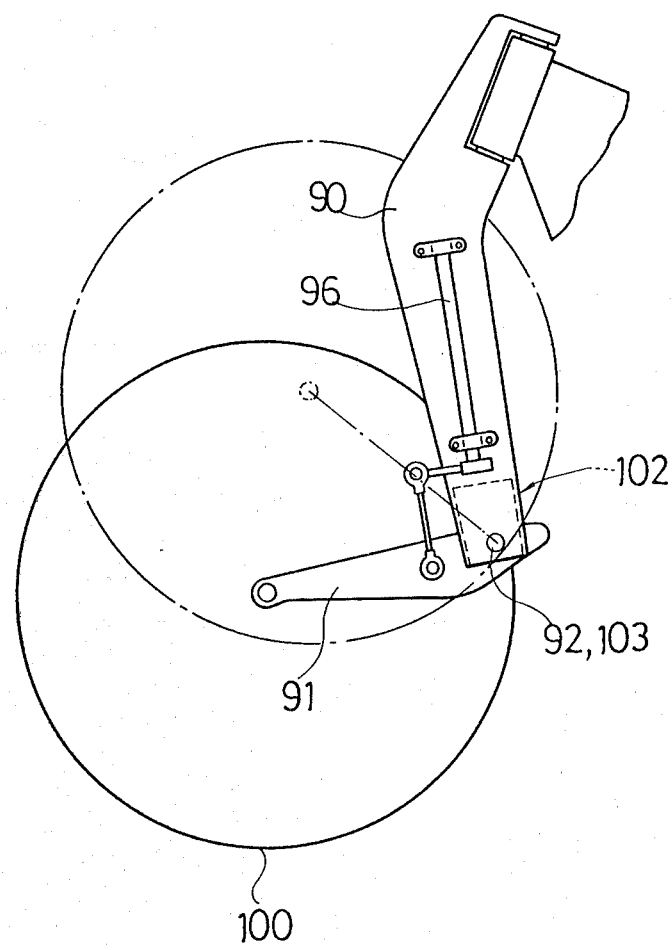
FIG. 6 is a side view of a front suspension system in accordance with a third embodiment of the present invention.

Referring now to FIG. 6, there is shown a front suspension system in accordance with a third embodiment of the present invention. A shaft 92 which connects between an upper fork 90 and an oscillating fork 91 serves as a pivot shaft 103 of a pivotable-shaft actuated damper mechanism 102, and the pivot shaft 103 is pivoted integrally with the rocking motion of the oscillating fork 91 which is performed about the shaft 92 to permit the vertical movement of a front wheel 100, thereby generating a damping force of the damper mechanism 102. In this embodiment, the oscillating fork 91 also serves as a pivoting lever for the damper mechanism 102.

Figure 7:
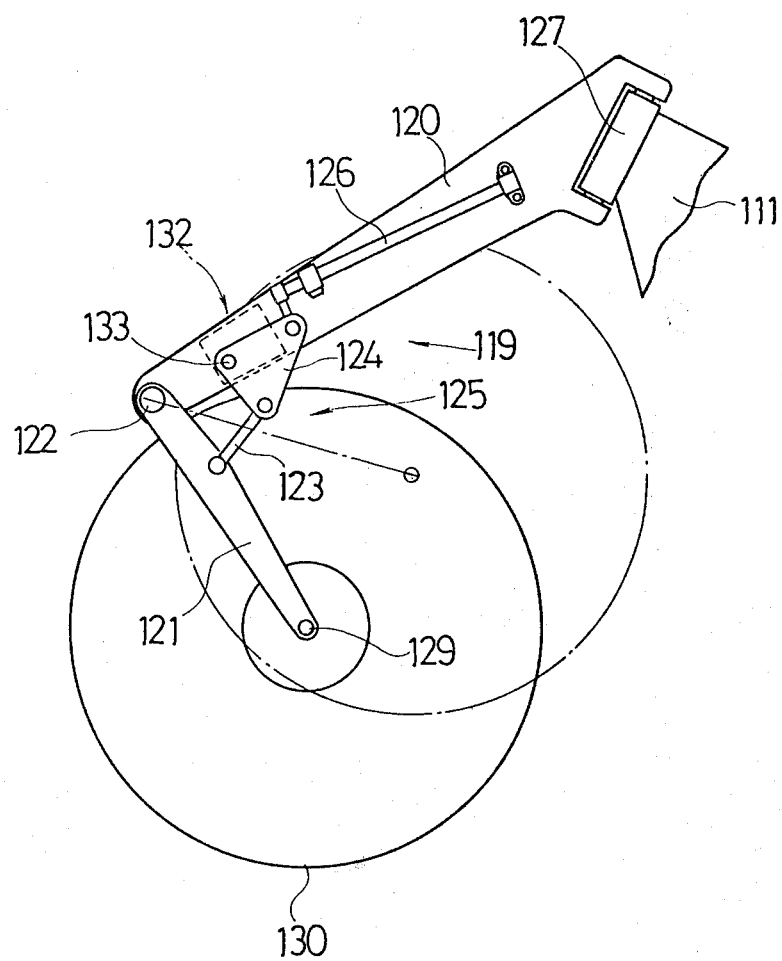
FIG. 7 is a side view of a front suspension system in accordance with a fourth embodiment of the present invention.

With reference to FIG. 7, there is shown a front suspension system 119 according to a fourth embodiment of the present invention. The front suspension system 119, as in the second embodiment shown in FIG. 5, is constructed of an upper fork 120 pivotably secured to a head pipe 127 of a vehicle body frame 111, and an oscillating fork 121 which is vertically pivotably connected to the upper fork 120 through a shaft 122 and which serves as a rocking member supporting a front wheel 130. In this embodiment, however, the upper fork 120 and the oscillating fork 121 are pivotably connected through the shaft 122 in a position forwardly of a front wheel axle 129, and therefore the front suspension system 119 serves as a trailing link mechanism. A pivotable-shaft actuated damper mechanism 132 is disposed within the lower portion of the upper fork 120 for shortening the length of an operating force transmission means 125 comprising a rod 123 and a substantially triangular lever 124, which transmission means connects between a pivot shaft 133 of the damper mechanism 132 and the oscillating fork 121. In this embodiment, as in the fourth embodiment, the shaft 122 and the pivot shaft 133 may be constituted by the same shaft.

In each of the embodiments described hereinabove, torsion bars 76, 96 and 126 adapted to cushion the vertical movement of the front wheel by virtue of the respective spring forces are attached to the upper forks 70, 90 and 120, respectively.

As will be understood from the foregoing description, the present invention is advantageous in that because the pivotable-shaft actuated damper mechanism for cushioning the front wheel is disposed within the upper fork, it is possible to have the body of the upper fork also serve as the casing of the damper mechanism, whereby simplification of both the structure and the molding operation as well as reduction of the number of parts is attained. Further, the damper mechanism can be advantageously disposed in any position within the upper fork and when it is positioned in a lower portion of the damper mechanism, the operating force transmission path connecting between the damper mechanism and the oscillating member which supports the front fork and which is provided below the upper fork, can be shortened, whereby reduction of the number of components of such path and improvement of the rigidity thereof can be attained.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A front suspension system for a motorcycle, comprising:
    an upper fork member supported for pivotal steering motion by a vehicle body frame;
    a lower fork member which supports a front wheel at one end thereof;
    a link mechanism which pivotably suspends said lower fork member from said upper fork member; and
    at least one pivotable-shaft actuated damper having a pivot shaft adapted to provide a pivotal reaction force proportional to a pivoted amount thereof in operative cooperation with said link mechanism, said pivotable-shaft actuated damper being disposed substantially entirely in the interior of said upper fork member.

2. A front suspension system according to claim 1, wherein:
    said upper fork member comprises a pair of right and left side members, at least one of said side members having said pivotable-shaft actuated damper disposed in the interior thereof.

3. A front suspension system according to claim 2, wherein:
    said link mechanism comprises two pairs of arm members.

4. A front suspension system according to claim 3, wherein:
    at least one of said arm members is pivotably connected to said upper fork member through said pivot shaft of said pivotable-shaft activated damper.

5. A front suspension system according to claim 2, wherein:
    said link mechanism comprises an operating force transmission means; and
    said upper fork member and said lower fork member are pivotably connected to each other at one point.

6. A front suspension system according to claim 5, wherein:
    said operating force transmission means is pivotably connected to said upper fork member through said pivot shaft of said pivotable-shaft actuated damper.

* * * * *